United States Patent
Rodrigues et al.

(10) Patent No.: US 12,413,454 B1
(45) Date of Patent: Sep. 9, 2025

(54) DECISION FEEDBACK EQUALIZER WITH FEEDFORWARD FINITE IMPULSE RESPONSE FILTER

(71) Applicant: Synopsys, Inc., Sunnyvale, CA (US)

(72) Inventors: Ricardo Rodrigues, Bragança (PT); Rúben Sousa, Lisbon (PT)

(73) Assignee: SYNOPSYS, INC., Sunnyvale, CA (US)

( * ) Notice: Subject to any disclaimer, the term of this patent is extended or adjusted under 35 U.S.C. 154(b) by 10 days.

(21) Appl. No.: 18/385,260

(22) Filed: Oct. 30, 2023

(51) Int. Cl.
*H04L 25/03* (2006.01)
*H04B 1/76* (2006.01)

(52) U.S. Cl.
CPC ......... *H04L 25/03057* (2013.01); *H04B 1/76* (2013.01)

(58) Field of Classification Search
CPC ............................ H04L 25/03057; H04B 1/76
See application file for complete search history.

(56) References Cited

U.S. PATENT DOCUMENTS

| | | | |
|---|---|---|---|
| 9,294,314 B2 * | 3/2016 | Mobin | H04L 25/03063 |
| 10,044,406 B1 * | 8/2018 | Dai | H04B 3/04 |
| 2013/0148712 A1 * | 6/2013 | Malipatil | H04L 7/033 |
| | | | 375/233 |
| 2013/0243070 A1 * | 9/2013 | Ito | H04L 27/01 |
| | | | 375/233 |
| 2014/0169426 A1 * | 6/2014 | Aziz | H03F 3/195 |
| | | | 375/232 |
| 2015/0110165 A1 * | 4/2015 | Ramadoss | H04L 25/03343 |
| | | | 375/232 |
| 2023/0353177 A1 * | 11/2023 | Hossain | H04L 27/06 |

\* cited by examiner

*Primary Examiner* — Dac V Ha
(74) *Attorney, Agent, or Firm* — Womble Bond Dickinson (US) LLP

(57) ABSTRACT

An equalizer circuit includes: an analog front end circuit configured to receive an analog input signal from a transmission line; an analog finite impulse response filter circuit including: a sample and hold circuit configured to sample an output of the analog front end circuit; and a weighting circuit configured to weight the output of the analog front end circuit to generate a feedforward signal; and a decision feedback equalizer circuit configured to receive an output of the analog front end circuit and the feedforward signal.

20 Claims, 10 Drawing Sheets

DECISION FEEDBACK EQUALIZER WITH FEEDFORWARD FINITE IMPULSE RESPONSE FILTER

TECHNICAL FIELD

The present disclosure relates to integrated circuits for communications systems. In particular, the present disclosure relates to an equalizer circuit of a receiver circuit of a communications system.

BACKGROUND

A serializer/deserializer (SerDes) is a pair of functional blocks used in high-speed communications. A serializer incorporated into a transmitter converts parallel data into serial data and therefore may also be referred to as a parallel-to-serial converter, where serialized data is transmitted over a communication channel. At a receiver connected to the communication channel, a deserializer converts the serial data back into parallel data and therefore may be referred to as a serial-to-parallel converter. When operating at high data rates, the transmitted serial data is distorted by the lossy communication channel, such as through frequency dependent attenuation.

High frequency serializer/deserializer (SerDes) communication systems such as Universal Serial Bus (USB), Peripheral Component Interconnect Express (PCIe), and the like include an equalizer circuit (or equalizer) in the receiver in order to compensate for distortions and reflections introduced by a transmission line between the transmitter and the receiver.

The above information disclosed in this Background section is only for enhancement of understanding of the present disclosure, and therefore it may contain information that does not form the prior art that is already known to a person of ordinary skill in the art.

SUMMARY

According to one embodiment of the present disclosure, an equalizer circuit includes: an analog front end circuit configured to receive an analog input signal from a transmission line; an analog finite impulse response filter circuit including: a sample and hold circuit configured to sample an output of the analog front end circuit; and a weighting circuit configured to weight the output of the analog front end circuit to generate a feedforward signal; and a decision feedback equalizer circuit configured to receive an output of the analog front end circuit and the feedforward signal.

The analog finite impulse response filter circuit may include a delay circuit configured to delay a clock signal controlling the sample and hold circuit.

The equalizer circuit may include a first input port for receiving a coefficient for a first tap, the weighting circuit of the analog finite impulse response filter circuit being configured to weight the output of the analog front end circuit based on the coefficient for the first tap, and the equalizer circuit may include a second input port for receiving a coefficient for a second tap, the decision feedback equalizer circuit being configured to weight an output of a slicer circuit based on the coefficient for the second tap.

The decision feedback equalizer circuit may include: a data slicer; and a plurality of clocked latches. The decision feedback equalizer circuit may further include a latch connected between the data slicer and the plurality of clocked latches.

The decision feedback equalizer circuit may be implemented in a digital signal processor.

The analog front end circuit may include a continuous time linear equalizer circuit.

According to one embodiment of the present disclosure, an receiver circuit includes: an equalizer circuit including: an analog front end circuit configured to receive an analog input signal from a transmission line; an analog finite impulse response filter circuit including: a sample and hold circuit configured to sample an output of the analog front end circuit; and a weighting circuit configured to weight the output of the analog front end circuit to generate a feedforward signal; and a decision feedback equalizer circuit configured to receive an output of the analog front end circuit and the feedforward signal; and a symbol decoder circuit configured to decode a stream of symbols received from the decision feedback equalizer circuit to generate a corresponding bitstream.

The receiver circuit may further include a controller configured to control: the weighting circuit of the analog finite impulse response filter circuit to weight the output of the analog front end circuit based on a coefficient for a first tap, and the decision feedback equalizer circuit to weight an output of a slicer circuit based on a coefficient for a second tap.

The analog finite impulse response filter circuit may a delay circuit configured to delay a clock signal controlling the sample and hold circuit.

The decision feedback equalizer circuit may include: a data slicer; and a plurality of clocked latches.

The decision feedback equalizer circuit may further include a latch connected between the data slicer and the plurality of clocked latches.

The decision feedback equalizer circuit may be implemented in a digital signal processor.

The analog front end circuit may include a continuous time linear equalizer circuit.

According to one embodiment of the present disclosure, a non-transitory computer-readable medium includes stored instructions, which when executed by a processor, cause the processor to generate a digital representation of an integrated circuit including: an analog front end circuit configured to receive an analog input signal from a transmission line; an analog finite impulse response filter circuit including: a sample and hold circuit configured to sample an output of the analog front end circuit; and a weighting circuit configured to weight the output of the analog front end circuit to generate a feedforward signal; and a decision feedback equalizer circuit configured to receive an output of the analog front end circuit and the feedforward signal.

The analog finite impulse response filter circuit may include a delay circuit configured to delay a clock signal controlling the sample and hold circuit.

The equalizer circuit may include a first input port for receiving a coefficient for a first tap, the weighting circuit of the analog finite impulse response filter circuit being configured to weight the output of the analog front end circuit based on the coefficient for the first tap, and the equalizer circuit may include a second input port for receiving a coefficient for a second tap, the decision feedback equalizer circuit being configured to weight an output of a slicer circuit based on the coefficient for the second tap.

The decision feedback equalizer circuit may include: a data slicer; and a plurality of clocked latches. The decision feedback equalizer circuit may further include a latch connected between the data slicer and the plurality of clocked latches.

The decision feedback equalizer circuit may be implemented in a digital signal processor.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
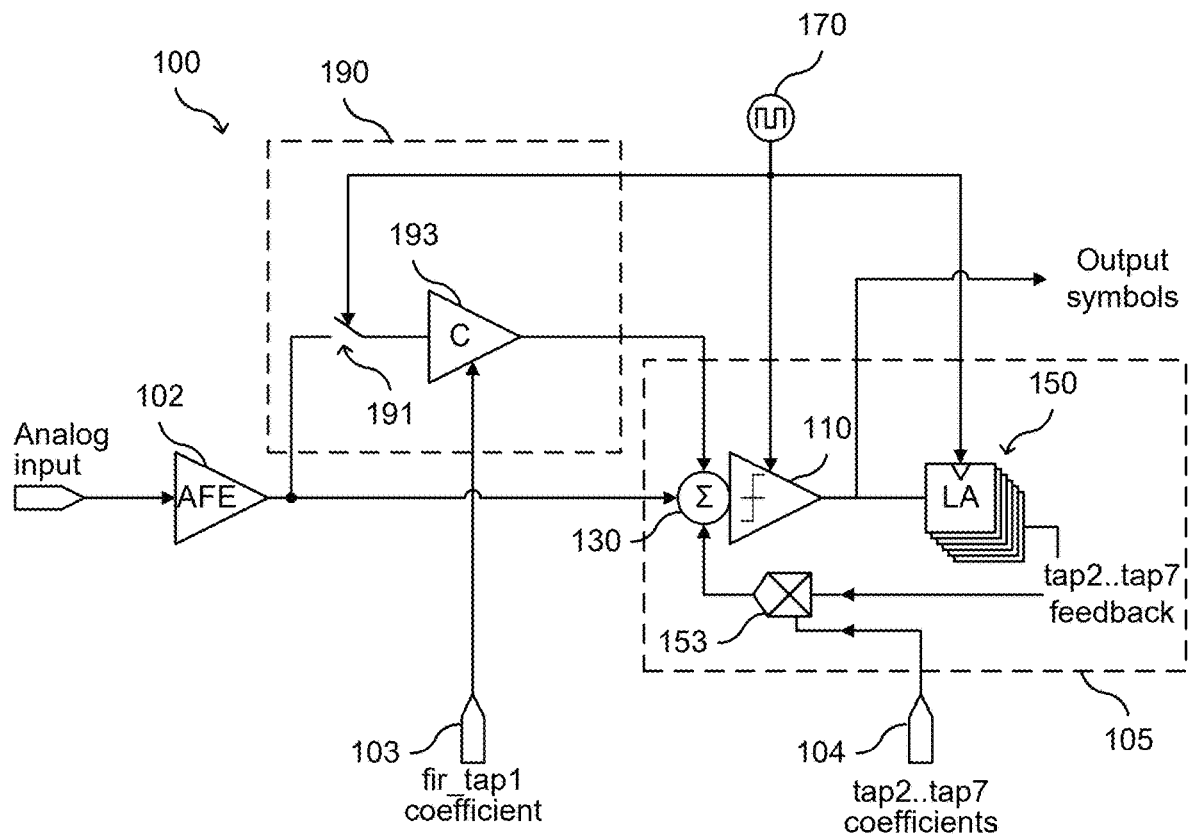
FIG. 1A is a circuit diagram depicting an equalizer circuit according to one embodiment of the present disclosure.

Aspects of the present disclosure relate to a decision feedback equalizer with a feedforward finite impulse response filter.

A serializer/deserializer (SerDes) communication system includes an equalizer circuit (or equalizer) at the receiver, where the equalizer is configured to compensate for distortions and reflections introduce by a transmission line between a transmitter and the receiver. In a SerDes communication system, a transmitter encodes messages as a sequence of symbols and supplies those symbols to a transmission line. The symbols may appear on the transmission line as, for example, different voltage levels (referred to as signaling levels) corresponding to different symbols. For example, pulse amplitude modulation (PAM) is a type of signal modulation scheme which uses different voltage levels to represent different symbols. A non-return-to-zero (NRZ) coding scheme has two voltage levels and therefore may correspond to two different symbols (e.g., 0 and 1). As further examples, a three-level PAM modulation (PAM-3) uses three different volage levels and PAM-4 uses four different voltage levels.

Distortions and reflections in transmission lines may introduce inter-symbol interference, such as where one symbol overlaps with another symbol. For example, inter-symbol interference may cause a low voltage to appear at a higher voltage level if the preceding symbol was a high voltage level that overlapped (e.g., due to a reflection on the transmission line) with the low voltage signal. At the receiver, an equalizer is applied to the received signal to compensate for these effects (e.g., to compensate for the inter-symbol interference) and then decodes the symbols to obtain the transmitted message.

A Decision Feedback Equalizer (DFE) is a component of an equalizer for a receiver that uses filtered versions of one or more previously determined symbols as feedback that the equalizer can compensate for the lingering effects (e.g., leakage) of preceding symbols on the channel. For example, in an N-level pulse amplitude modulation protocol (PAM-N), a data slicer is configured to quantize an input analog voltage to one of the N different levels, thereby determining which of the symbols was received. Each such filtered version of a previously determined symbol may be referred to as a tap, where an n-tap DFE uses feedback from the n preceding symbols. In more detail, these preceding symbols can be weighted by corresponding coefficients and the resulting weighted values are combined (e.g., subtracted from) the current symbol to compensate for such inter-symbol interference.

As the speeds of SerDes communications systems increase (e.g., to 16 gigabytes per second or more), the amount of time available to compute the feedback signals decreases. This is especially challenging when computing feedback based on the first tap (e.g., the symbol received directly prior to the current symbol that is to be equalized), which has a critical timing path defined by a decision time of a comparator in the data slicer plus the propagation delay and settling time, which all must be completed within a timing window of the duration of one symbol (1 unit interval or UI), which grows shorter with increasing speeds of SerDes communications systems.

Some approaches address this short time by using a loop unrolled circuit, which pre-computes feedback signals for each possible symbol and then supplies the appropriate feedback signal based on the result of decoding that symbol (e.g., selecting from among all of the pre-computed feedback signals based on the determined signal). A loop unrolled circuit uses N*(N−1) data slicer circuits where N is the number of signaling levels. Loop un-rolling results in increased area and power consumption for the equalizer circuit. For example, a full rate equalizer operating on pulse-amplitude modulation signaling with four signaling levels (PAM-4) would require 4×3=12 slicers. Such a full rate equalizer would run at the clock rate of the PAM signaling, which may be a high clock rate in the case of high bitrate PAM signaling.

Using multiple equalizers to operate on different symbols can allow the equalizers to operate at lower clock rates. For example, in a half-rate equalizer, one equalizer may be configured to be triggered on rising edges and the other equalizer may be used on falling edges (e.g., operating on alternating symbols), such that each equalizer operates at half the clock rate of the input signal. However, this duplication of equalizers further increases the number of data slicers. For example, a quarter-rate pulse-amplitude modulation with four signaling levels (PAM-4) receiver would require 4×4×3=48 slicers (12 slicers for each of the four copies of the DFE in the quarter-rate arrangement), which would consume a large amount of space on the circuit and consume a high amount of power during operation, thereby increasing peak power consumption, reducing battery life, and/or increasing heat generated by electronic communications systems that used loop un-rolling circuits. The problem grows super-linearly (e.g., quadratically) as the number of signaling levels increases, such as where a loop unrolled DFE circuit for PAM-16 would require 16×15 data slicer circuits for each copy of the DFE (e.g., 240 data slicer circuits in the case of a full rate equalizer circuit, 480 data slicer circuits in the case of a half rate equalizer circuit, 960 data slicer circuits in the case of a quarter rate equalizer circuit, and so on). The number of slicers further imposes an increased load on an analog front end (AFE) that feeds into the slicers (e.g., increases current draw and higher power consumption). As such, implementations using a loop-un-rolled circuit may be impractical at 3 level signaling and at higher bitrates (e.g., above 32 Gbps).

Aspects of embodiments relate to using an analog finite impulse response (FIR) filter as a feedforward branch, in place of the first tap of an n-tap decision feedback equalizer (DFE). Feedback from the remaining taps (e.g., the remaining n−1 taps) may be implemented using decision feedback paths (e.g., based on the determined symbols of those n−1 taps). Such an equalizer circuit according to embodiments of the present disclosure having a DFE with a feedforward FIR filter can be implemented in a PAM-N receiver using N−1 data slicer circuits (instead of N*(N−1) data slicer circuits in the case of a loop unrolled equalizer circuit).

Technical advantages of the present disclosure include, but are not limited to, providing a circuit for providing a feedforward signal corresponding to a first tap of the DFE, where such a circuit has a simpler design than comparable designs while still meeting the tight timing constraints of high speed SerDes communications links. Circuits according to embodiments of the present disclosure have substantially smaller area than the use of an analog-to-digital converter (ADC) circuit and smaller area than comparable loop un-rolled circuits for the first tap of the DFE, where the complexity of circuits according to embodiments of the present disclosure does not increase based on the number of signaling levels (e.g., the same design can be used for PAM-3 and PAM-4). The simpler equalizer circuits according to embodiments of the present disclosure also consume less power than comparable loop un-rolled circuits or ADC circuit (which may be used together with digital signal processor (DSP) to generate the feedback signals for the DFE), such that the battery life, peak power usage, and/or heat production of a SerDes receiver in an electronic communication system (e.g., a PCIe receiver in a laptop computer, a desktop computer, or a server computer, or other communications links such as USB in a laptop computer, a desktop computer, or a smartphone, or the like) is improved. For example, DSPs are commonly designed to meet the protocol performance requirements of the highest data rate supported by the protocol. For the protocol lower rates, that also needs to be supported to ensure the physical layer (PHY) compliance with the protocol standard, these DSPs are not flexible enough to avoid receiver overdesign. Overdesigned receiver circuits have high complexity and corresponding high area usage and power consumption, thereby imposing a high power consumption penalty even when the receiver is operating at a lower bitrate. The power consumption of a DSP-based receiver can be several times higher compared to a receiver implemented without a DSP when the PHY is operating at one quarter or one eighth of its maximum data rate (e.g., a PCIe6 PHY receiver operating at PCIe4 or PCIe3 bitrates).

Embodiments of the present disclosure also provide an advantage in significantly lower clock data recovery (CDR) latency, which increases the CDR bandwidth and improves receiver jitter tolerance robustness. In more detail, mixed signal bang-bang clock and data recovery (CDR) circuits exhibit lower latency and higher bandwidth for the same bit rates and transition density when compared with Mueller-Muller CDR circuits, which may be used on digital signal processor (DSP)-based receivers. However, the implementation of a PAM-N mixed signal receiver is limited to designs with direct decision DFEs. As noted above, technical advantages of the present disclosure relate to providing a feedforward signal for the first tap (tap1), thereby solving a problem associated with meeting the timing constraints for the first tap (tap1). Accordingly, embodiments of the present disclosure help receiver circuits to meet communication protocol requirements with respect to Jitter Tolerance (JTOL) tests.

FIG. 1A is a circuit diagram depicting an equalizer circuit 100 according to one embodiment of the present disclosure. The equalizer circuit 100 in the embodiment of FIG. 1A is a component of a receiver circuit of a communication system. An analog input signal is supplied to an analog front end (AFE) 102 of the equalizer circuit 100. The analog input signal may be received from a transmitter circuit of the communication system via a transmission line and represents a distorted version of a voltage waveform transmitted by the transmitter circuit. The analog input may also be filtered prior to being supplied to the AFE 102 (e.g., high-pass filtered or band-pass filtered) and/or the AFE may also include other analog filters.

In some embodiments, the AFE 102 of the equalizer circuit 100 includes a continuous time linear equalizer (CTLE), where the CTLE is configured to reduce frequency-dependent distortions in the received signal. For example, the transmission line may cause signals at different frequencies to be attenuated by different amounts, where higher frequencies may exhibit greater attenuation than lower frequencies. Accordingly, a CTLE may be configured to peak (e.g., apply frequency-dependent amplification) an analog input signal to amplify the higher frequency portions of the analog input signal more than lower frequency portions of the analog input signal.

The AFE 102, which may include a CTLE, supplies its output to a portion of the equalizer circuit that removes inter-symbol interference (ISI).

A component of this portion of an equalizer circuit is referred to as a decision feedback equalizer (DFE) 105 which is a non-linear equalizer. In a decision feedback equalizer, a data slicer 110 makes a symbol decision (e.g., determines a symbol based on an analog input). In the case of PAM, a data slicer 110 quantizes its input based on one or more offset voltages. For example, in the case of non-return-to-zero (NRZ), the analog input may vary between two nominal voltage levels, say $V_0$ (e.g., 0V) and $V_1$ (e.g., 5V). An offset voltage may determine a threshold between the two nominal voltage levels (e.g., $(V_0+V_1)/2$), such that an input analog voltage below the offset voltage is quantized to the low voltage $V_0$ and an input analog voltage above the offset voltage is quantized to the high voltage $V_1$. In the case of more signaling levels, the offset voltage may define multiple threshold voltages, e.g., in the case of PAM-3 with three different signaling levels ($V_0$, $V_1$, and $V_2$), a first threshold may be set at $(V_0+V_1)/2$ and a second threshold may be set at $(V_1+V_2)/2$, where the data slicer 110 quantizes the analog input signals accordingly (to $V_0$, $V_1$, and $V_2$).

In a DFE, ISI (Inter-Symbol Interference) is estimated by weighting the previously received signals and directly subtracted from the incoming signal via a feedback FIR filter. As shown in FIG. 1A, a summing circuit 130 is placed between the AFE 102 (or the CTLE) and the data slicer 110, where the summing circuit 130 subtracts the estimated effect of the ISI from the previous symbols. Generally, the previous symbols can be conceptualized as being supplied to a delay line, where each element of the delay line delays the signal by one clock cycle. Taps from this delay line therefore correspond to the quantized output of the slicer for the symbol at a corresponding clock cycle. Taking the current input symbol to be kth input symbol, the first tap (tap1) corresponds to the (k−1)st symbol, the second tap (tap2) corresponds to the (k−2)nd symbol, and so on. Each such tap is multiplied by a coefficient (or weight) representing the magnitude of the intersymbol interference caused by that signal. Generally, more recent symbols (later symbols) have a larger effect on the current symbol than symbols from the more distant past (earlier symbols) and therefore the coefficients corresponding to higher-numbered taps generally have smaller magnitudes.

In cases where the DFE is the only equalization block, its tap coefficients may equal the un-equalized channel pulse response values. When a DFE is used in combination with other equalization blocks, the DFE tap coefficients may equal the pre-DFE impulse response.

Accordingly, as shown in FIG. 1A, the equalizer circuit 100 includes a DFE 105 that includes a plurality of clocked latches 150 that are configured to store the symbols corresponding to the second tap (tap2 or the (k−2)nd symbol) and higher (e.g., (k−3)rd symbol, etc.). FIG. 1A shows an example with a 7-tap equalizer circuit and therefore the clocked latches 150 of the DFE circuit 105 store tap 2 through tap 7 (e.g., corresponding to the (k−2)nd symbol through the (k−7)th symbol). A weighting circuit 153 weights these tap feedback values by corresponding coefficients (tap2 through tap7 coefficients) and supplies the weighted feedback values to the summing circuit 130, which subtracts the weighted values from the output of the AFE 102.

The weighting circuit 153 may include, for example, a plurality of current digital-to-analog converters (current DACs), with one current DAC for each of the taps, where the gain of each amplifier is set by a corresponding one of the coefficients. A current DAC takes a digital value and an analog reference voltage as inputs. In some embodiments, the current DAC for a given tap is supplied with the latched analog voltage as its reference voltage and a digital representation of the corresponding coefficient as the digital value. The digital value selects, for example, resistors of a resistor network in the current DAC such that the output current of the current DAC is controlled by both the input analog voltage and the input digital value. In such an example where the weighted signals are currents, the summing circuit 130 may be implemented as a summing node at the input of the data slicer 110.

A controller circuit connected to the equalizer circuit 100 sets the coefficients based on the conditions of the transmission line through which the analog input was received such as by supplying the coefficients through a first input port 103 and a second input port 104. A clock 170 provides a clock signal that controls the data slicer 110 to sample the current value of the analog signal from the summing circuit 130, and the clock 170 also controls the clocked latches 150 to shift the determined values from one latch to the next latch. The clock 170 is synchronized with the analog input signal to control the data slicer 110 to sample near the center of the UI (e.g., near the center of the eye).

Due to the tight timing constraints at high bitrates, aspects of embodiments of the present disclosure relate to an equalizer circuit that includes an analog finite impulse response (FIR) filter circuit 190 configured to generate a feedforward signal to compensate for intersymbol interference from the symbol immediately preceding the current symbol k (the (k−1) st symbol). The feedforward signal produced by the analog FIR filter circuit 190 corresponds to the first tap (tap1) weighted by a corresponding coefficient (tap1 coefficient). Using a feedforward signal instead of a feedback signal removes the need to generate a first feedback tap (for the (k−1) st symbol) within the tight or narrow timing window of a single UI (the length of a single symbol). Therefore, embodiments of the present disclosure enable implementation of an equalizer circuit that compensates for intersymbol interference without the use of loop unrolling and without pre-computing of redundant values, where such an equalizer has much smaller area and power consumption than an equalizer circuit that included the use of a loop unrolled circuit to compute a first tap feedback signal.

In more detail, the analog FIR filter circuit 190 includes a sample and hold (S/H) circuit 191 (shown in FIG. 1A as a switch) that samples the current analog voltage from the AFE 102 and supplies the held voltage to a weighting circuit 193, which weights the sampled voltage in accordance with a coefficient for the first tap (fir_tap1 coefficient) signal supplied through a first input port 103. In some embodiments, the weighting circuit 193 is implemented using a current digital to analog converter (DAC). A controller circuit connected to the equalizer circuit 100 sets the tap1 coefficient through the first input port 103 based on the conditions of the transmission line through which the analog input was received. The clock 170 provides a clock signal that controls the sample and hold circuit 191 to sample the output of the AFE 102 (e.g., such as the sampling is aligned with the eye of the signal based on the recovered clock rate of the analog input signal) during a previous unit interval (e.g., a (k−1) st unit interval) and the sample and hold circuit 191 holds the value such that the output of the analog FIR filter circuit 190 is supplied to the summing circuit 130 during a current unit interval (e.g., a kth unit interval).

Figure 1B:
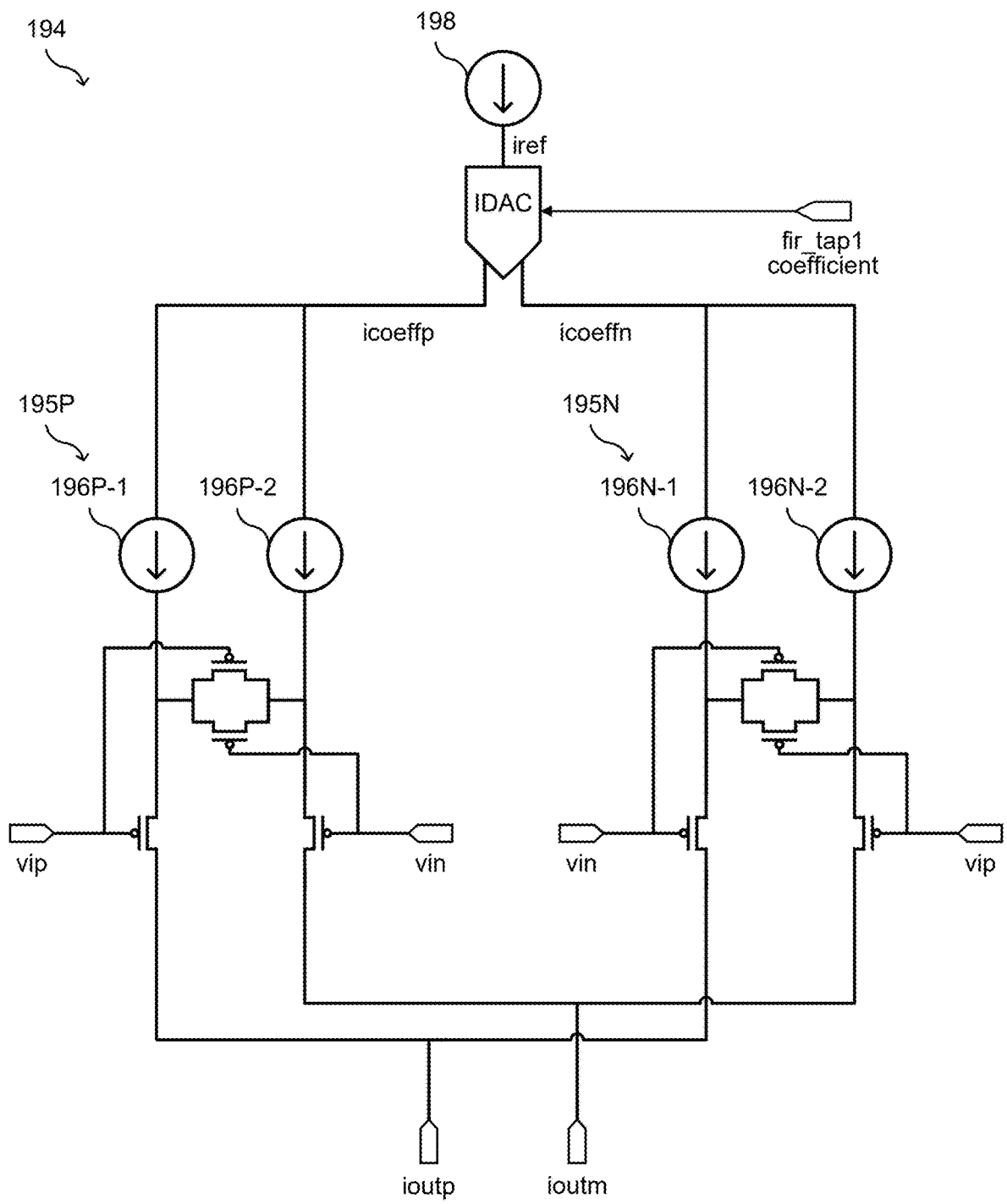
FIG. 1B is a circuit diagram depicting a weighting circuit according to one embodiment of the present disclosure.

FIG. 1B is a circuit diagram depicting a weighting circuit 194 according to one embodiment of the present disclosure. In some embodiments, the weighting circuit 194 shown in FIG. 1B may be used in the weighting circuit 193 shown in FIG. 1A. In the example shown in FIG. 1B, a weighting circuit is implemented using a transconductance cell or $g_m$ cell to generate the coefficient for the feedforward signal, where a linearized voltage-to-current transducer is used for each side of the first tap (tap1) supplied to the summing circuit 130. As shown in FIG. 1B, the weighting circuit 194 includes a first linearized voltage-to-current transducer circuit 195P for the positive side of the first tap and a second linearized voltage-to-current transducer circuit 195N for the negative side of the first tap, where the first linearized voltage-to-current transducer circuit 195P may be supplied with a positive bias voltage and the second linearized voltage-to-current transducer circuit 195N may be supplied with a negative bias voltage. The input signal from the sample and hold circuit 191 include a positive signal vip and a negative signal (vin) that are supplied to both the first linearized voltage-to-current transducer circuit 195P and the second linearized voltage-to-current transducer circuit 195N. The coefficient applied to the input signal by the weighting circuit 194 is controlled by current sources 196P-

1, 196P-2, 196N-1, and 196N-2. In more detail, first current source 196P-1 and second current source 196P-2 of the first linearized voltage-to-current transducer circuit 195P generate currents set by a positive current coefficient icoeffp produced by a current digital-to-analog converter (IDAC) 197 and first current source 196N-1 and second current source 196N-2 of the second linearized voltage-to-current transducer circuit 195N generate currents set by a negative current coefficient icoeffn produced by a current digital-to-analog converter (IDAC) 197. The coefficient is controlled through the IDAC 197 in a manner similar to the DFE taps. The IDAC biasing current iref comes from a constant $g_m$ current source 198 and controls the $g_m$ of the $g_m$ cells. Steering the current from one side to the other changes the polarity of the coefficient. When the current is equal on both sides, then the coefficient is zero. The common mode current in this circuit is constant.

In a half-rate implementation of a receiver circuit, the equalizer circuit 100 is replicated into even and odd paths (e.g., two copies of the equalizer circuit 100, one for even numbered and one odd numbered symbols) and driven by inverted clocks (two different clocks, where one clock is the inverse of the other). The two equalizer circuits in a half-rate implementation may each have a separate plurality of clocked latches 150 storing the previously determined symbols, where the two equalizer circuits take turns writing to the first latch of the plurality of latches. As each side samples in one edge of the clock, each path of the equalizer circuit 100 includes two delay lines, each with the actual and delayed versions of the edge sampled data. The data from one side is fed to the other (e.g., the data from the even path is fed to the odd path and the data from the odd path is fed to the even path).

In a quarter-rate implementation, the equalizer circuit 100 would be replicated into four paths (four copies of the equalizer circuit 100), where the circuits are driven by quadrature clocks. The four equalizer circuits in a quarter-rate implementation may each have a separate plurality of clocked latches 150 storing the previously determined symbols, where the data from the four equalizer circuits are written to the latches of the other equalizer circuits to provide the feedback signals.

In PAM-3 implementations, the data slicer 110 would include three paths, one for each of the three different voltage signaling levels (a set by corresponding voltage offset thresholds). Similarly, for in PAM-4 implementations, the data slicer 110 would include four paths, one for the four different voltage signaling levels.

As noted above while FIG. 1A shows an example of an equalizer circuit using seven taps, embodiments of the present disclosure are not limited thereto and include other embodiments with equalizers using any other number of taps (at least one tap). In some embodiments of the present disclosure, the taps include floating taps, where the position of the taps (e.g., the number of unit intervals of delay) is adjustable to accommodate for different reflection distortions introduced by the transmission line (e.g., reflections may appear with different amounts of delay based on conditions such as the length of the transmission line).

Figure 2:
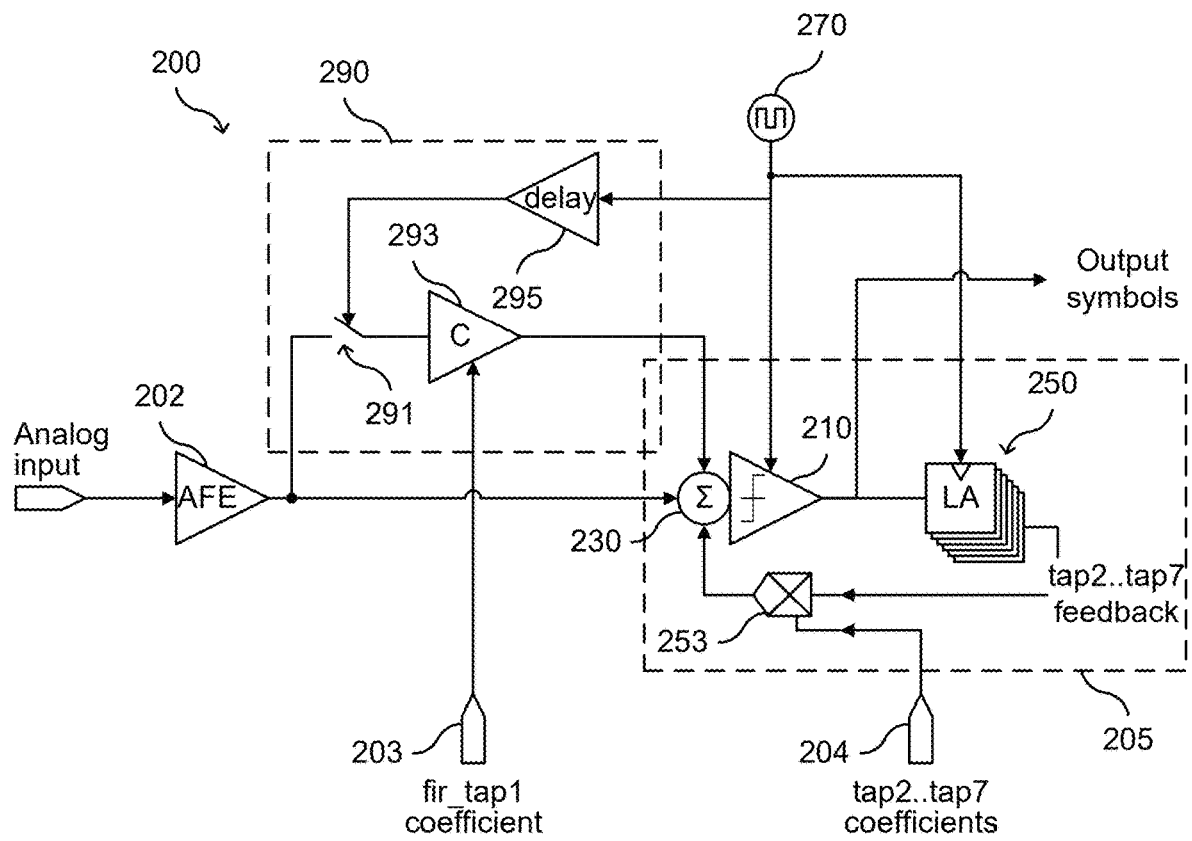
FIG. 2 is a circuit diagram depicting an equalizer circuit according to one embodiment of the present disclosure.

FIG. 2 is a circuit diagram depicting an equalizer circuit 200 according to one embodiment of the present disclosure. The embodiment of the equalizer circuit 200 shown in FIG. 2 is substantially similar to that of the equalizer circuit 100 shown in FIG. 1A and further includes a delay circuit 295 in an analog FIR filter circuit 290 configured to compute the feedforward signal for the first tap (tap1).

The equalizer circuit 200 in the embodiment of FIG. 2 is a component of a receiver circuit of a communication system. An analog input signal is supplied to an analog front end (AFE) 202 of the equalizer circuit 200. The analog input signal may be received from a transmitter circuit of the communication system via a transmission line and represents a distorted version of a voltage waveform transmitted by the transmitter circuit. The analog input may also be filtered prior to being supplied to the AFE 202 (e.g., high-pass filtered or band-pass filtered) and/or the AFE may also include other analog filters. In some embodiments, the AFE 202 includes a CTLE. The equalizer circuit 200 further includes a data slicer 210 configured to make symbol decisions based on its analog input, which may be received through a summing circuit 230, which is configured to subtract the estimated effect of the ISI from previous symbols.

As shown in FIG. 2, the equalizer circuit 200 includes a portion having a DFE circuit 205 that includes a plurality of clocked latches 250 configured to store the symbols corresponding to the second tap (tap2 or the (k−2)nd symbol) and higher (e.g., (k−3)rd symbol, etc.). FIG. 2 shows an example with a 7-tap intersymbol equalizer circuit and therefore the clocked latches 250 store tap 2 through tap 7 (e.g., corresponding to the (k−2)nd symbol through the (k−7)th symbol). A weighting circuit 253 weights these tap feedback values by corresponding coefficients (tap2 through tap7 coefficients) supplied through a second input port 204 and supplies the weighted feedback values to the summing circuit 230, which subtracts the weighted values from the output of the AFE 202. The weighting circuit 253 may include, for example, a plurality of current digital-to-analog converters (current DACs), with one current DAC for each of the taps, where the gain of each amplifier is set by a corresponding one of the coefficients.

A controller circuit connected to the equalizer circuit 200 sets the coefficients based on the conditions of the transmission line through which the analog input was received, such as by supplying the coefficients through a first input port 203 and a second input port 204. A clock 270 provides a clock signal that controls the data slicer 210 to sample the current value of the analog signal from the summing circuit 230, and the clock 270 provides a clock signal that also controls the clocked latches 250 to shift the determined values from one latch to the next latch. The clock 270 provides a clock signal that is synchronized with the analog input signal to control the data slicer 210 to sample near the center of the UI (e.g., near the center of the eye).

The analog FIR filter circuit 290 includes a sample and hold (S/H) circuit 291 (shown in FIG. 2 as a switch) that samples the current analog voltage from the AFE 202 and supplies the held voltage to a weighting circuit 293, which weights the sampled voltage in accordance with a coefficient for the first tap (fir_tap1 coefficient) signal, e.g., received through the first input port 203. In some embodiments, the weighting circuit 293 is implemented using a current digital to analog converter (DAC). A controller circuit connected to the equalizer circuit 200 sets the tap1 coefficient based on the conditions of the transmission line through which the analog input was received.

As noted above, the analog FIR filter circuit 290 of the equalizer circuit 200 shown in FIG. 2 further includes a delay circuit 295 configured to delay the clock signal received from the clock 270 before it is supplied to control the sample and hold circuit 291. The delay circuit 295 corrects for timing differences in the time at which the data slicer 210 performs a decision on the current symbol and the time at which the sample and hold circuit 291 samples the output of the AFE 202.

Figure 3:
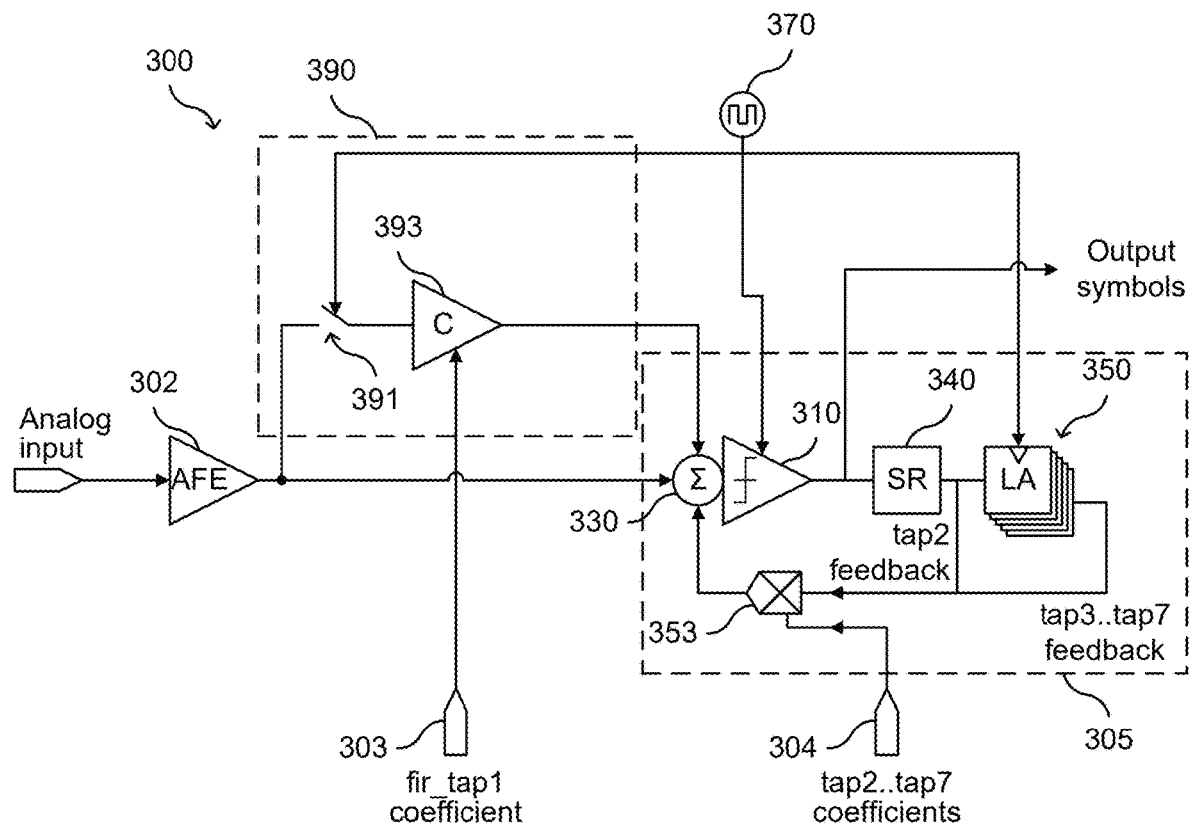
FIG. 3 is a circuit diagram depicting an equalizer circuit according to one embodiment of the present disclosure.

FIG. 3 is a circuit diagram depicting an equalizer circuit 300 according to one embodiment of the present disclosure. The embodiment of the equalizer circuit 300 shown in FIG. 3 is substantially similar to that of the equalizer circuit 100 shown in FIG. 1A and further includes a latch 340 (e.g., a set-reset latch or SR latch) between a data slicer 310 and a plurality of clocked latches 350.

The equalizer circuit 300 in the embodiment of FIG. 3 is a component of a receiver circuit of a communication system. An analog input signal is supplied to an analog front end (AFE) 302 of the equalizer circuit 300. The analog input signal may be received from a transmitter circuit of the communication system via a transmission line and represents a distorted version of a voltage waveform transmitted by the transmitter circuit. The analog input may also be filtered prior to being supplied to the AFE 302 (e.g., high-pass filtered or band-pass filtered) and/or the AFE may also include other analog filters. In some embodiments, the AFE 302 includes a CTLE. The equalizer circuit 300 further includes a DFE portion 305 which includes a data slicer 310 configured to make symbol decisions based on its analog input, which may be received through a summing circuit 330, which is configured to subtract the estimated effect of the ISI from previous symbols.

As shown in FIG. 3, the DFE portion 305 of the equalizer circuit 300 includes a latch 340 configured to supply the feedback signal for the second tap (tap2 feedback) directly to a weighting circuit 153. In this embodiment, the data slicer 310 is assumed to introduce a delay of one unit interval (UI) and therefore, it is not necessary to delay the feedback signal for this second tap in a separately clocked latch.

The DFE portion 305 of the equalizer circuit 300 also includes the plurality of clocked latches 350 that store the symbols corresponding to the third tap (tap3 or the (k−3)rd symbol) and higher (e.g., (k−4)th symbol, etc.), where the input to the first of the clocked latches 350 is supplied from the output of the latch 340. FIG. 3 shows an example with a 7-tap DFE and therefore the clocked latches 350 store tap 3 through tap 7 (e.g., corresponding to the (k−3)rd symbol through the (k−7)th symbol).

A weighting circuit 353 weights these tap feedback values by corresponding coefficients (tap2 through tap7 coefficients), which may be received through a second input port 304 and supplies the weighted feedback values to the summing circuit 330, which subtracts the weighted values from the output of the AFE 302. The weighting circuit 353 may include, for example, a plurality of current digital-to-analog converters (current DACs), with one current DAC for each of the taps, where the gain of each amplifier is set by a corresponding one of the coefficients.

A controller circuit connected to the equalizer circuit 300 sets the coefficients based on the conditions of the transmission line through which the analog input was received, such as by supplying the coefficients through a first input port 303 and a second input port 304. A clock 370 controls the data slicer 310 to sample the current value of the analog signal from the summing circuit 330, and the clock 370 also controls the clocked latches 350 to shift the determined values from one latch to the next latch. The clock 370 is synchronized with the analog input signal to control the data slicer 310 to sample near the center of the UI (e.g., near the center of the eye).

The analog FIR filter circuit 390 includes a sample and hold (S/H) circuit 391 (shown in FIG. 3 as a switch) that samples the current analog voltage from the AFE 302 and supplies the held voltage to a weighting circuit 393, which weights the sampled voltage in accordance with a coefficient for the first tap (fir_tap1 coefficient) signal supplied through the first input port 303. In some embodiments, the weighting circuit 393 is implemented using a current digital to analog converter (DAC). A controller circuit connected to the equalizer circuit 300 sets the tap1 coefficient based on the conditions of the transmission line through which the analog input was received.

Figure 4:
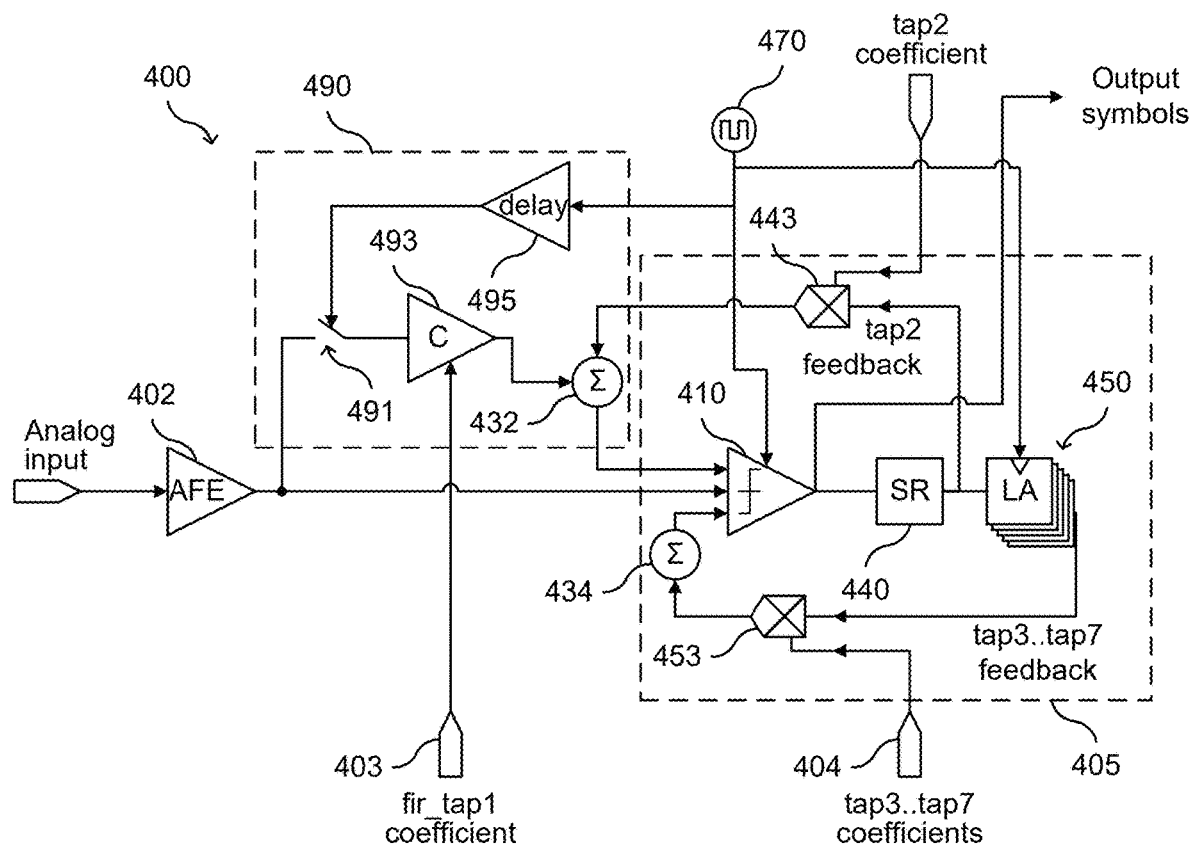
FIG. 4 is a circuit diagram depicting an equalizer circuit according to one embodiment of the present disclosure.

FIG. 4 is a circuit diagram depicting an equalizer circuit 400 according to one embodiment of the present disclosure. The equalizer circuit 400 shown in the embodiment of FIG. 4 is similar to the equalizer circuits shown in FIGS. 1, 2, and 3 in that it includes a delay circuit 495 similar to that of the delay circuit 295 of FIG. 2 and a latch 440 for the second tap similar to the latch 340 of FIG. 3. The equalizer circuit 400 of FIG. 4 further includes separate summing circuits 432 and 434 instead of a single summing circuit as shown in the embodiments of FIG. 1A, FIG. 2, and FIG. 3.

The equalizer circuit 400 in the embodiment of FIG. 4 is a component of a receiver circuit of a communication system. An analog input signal is supplied to an analog front end (AFE) 402 of the equalizer circuit 400. The analog input signal may be received from a transmitter circuit of the communication system via a transmission line and represents a distorted version of a voltage waveform transmitted by the transmitter circuit. The analog input may also be filtered prior to being supplied to the AFE 402 (e.g., high-pass filtered or band-pass filtered) and/or the AFE may also include other analog filters. In some embodiments, the AFE 402 includes a CTLE. The equalizer circuit 400 further includes a DFE portion 405 which includes a data slicer 410 configured to make symbol decisions based on its analog input, which may be received through a first summing circuit 432 and a second summing circuit 434, which are configured to combine the estimated effect of the ISI from previous symbols and supply these signals as input to the data slicer 410 along with the analog input as processed by the AFE 402.

As shown in FIG. 4, the DFE portion 405 of the equalizer circuit 400 includes a latch 440 configured to supply the feedback signal for the second tap (tap2 feedback) directly to a weighting circuit 153. In this embodiment, the data slicer 410 is assumed to introduce a delay of one unit interval (UI) and therefore, it is not necessary to delay the feedback signal for this second tap in a separately clocked latch. The output of the latch 440 is supplied to a first weighting circuit 443 (e.g., implemented as a current DAC) that takes in a corresponding coefficient for the second tap (tap2 coefficient) and supplies the weighted feedback signal to the first summing circuit 432.

The equalizer circuit 400 also includes a plurality of clocked latches 450 that store the symbols corresponding to the third tap (tap3 or the (k−3)rd symbol) and higher (e.g., (k−4)th symbol, etc.), and the input to the first latch of the clocked latches 450 is taken from the output of the latch 440. FIG. 4 shows an example with a 7-tap DFE and therefore the clocked latches 450 store tap 3 through tap 7 (e.g., corresponding to the (k−3)rd symbol through the (k−7)th symbol).

A second weighting circuit 453 weights these tap feedback values by corresponding coefficients (tap2 through tap7 coefficients), as received through a second input port 404, and supplies the weighted feedback values to the second summing circuit 434, which combines the weighted values computed by the second weighting circuit 453. The second weighting circuit 453 may include, for example, a plurality of current digital-to-analog converters (current DACs), with one current DAC for each of the taps, where the gain of each amplifier is set by a corresponding one of the coefficients.

A controller circuit connected to the equalizer circuit 400 sets the coefficients based on the conditions of the transmission line through which the analog input was received, such as by supplying the coefficients through a first input port 403 and a second input port 404. A clock 470 provide a clock signal that controls the data slicer 410 to sample the current value of the analog signal from the first summing circuit 432, the second summing circuit 434, and the output of the AFE 402, and the clock 470 provides a clock signal that also controls the clocked latches 450 to shift the determined values from one latch to the next latch. The clock 470 provides a clock signal that is synchronized with the analog input signal to control the data slicer 410 to sample near the center of the UI (e.g., near the center of the eye).

The analog FIR filter circuit 490 includes a sample and hold (S/H) circuit 491 (shown in FIG. 4 as a switch) that samples the current analog voltage from the AFE 402 and supplies the held voltage to a weighting circuit 493, which weights the sampled voltage in accordance with a coefficient for the first tap (fir_tap1 coefficient) signal as received through the first input port 403. In some embodiments, the weighting circuit 493 is implemented using a current digital to analog converter (DAC). A controller circuit connected to the equalizer circuit 400 sets the tap1 coefficient based on the conditions of the transmission line through which the analog input was received.

As noted above, the analog FIR filter circuit 490 of the equalizer circuit 400 shown in FIG. 4 further includes a delay circuit 495 configured to delay the clock signal provided by the clock 470 before it is supplied to control the sample and hold circuit 491. The delay circuit 495 corrects for timing differences in the time at which the data slicer 410 performs a decision on the current symbol and the time at which the sample and hold circuit 491 samples the output of the AFE 402.

The weighted output of the weighting circuit 493 is supplied to the first summing circuit 432 which combines with the weighted second feedback value corresponding to the second tap.

The output of the first summing circuit 432 and the output of the second summing circuit 434 is supplied as inputs to the data slicer 410, which adjusts the output of the AFE 202 to correct for the intersymbol interference from previous symbols.

Figure 5:
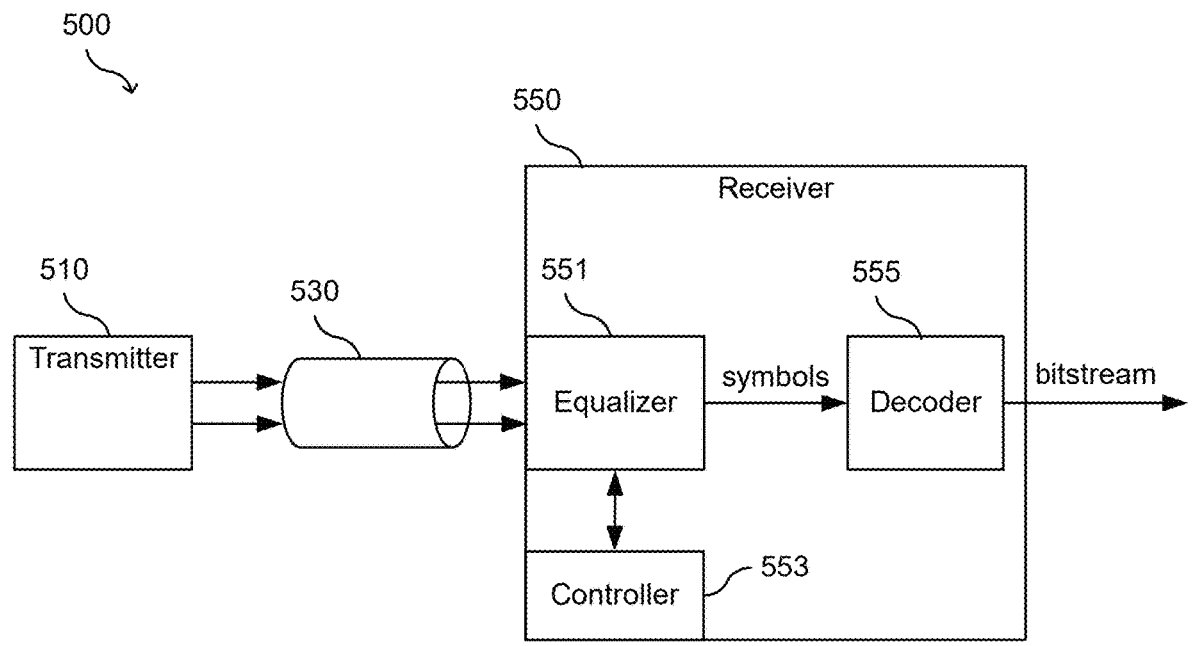
FIG. 5 is a block diagram of a transmitter and a receiver including an equalizer circuit according to various embodiments of the present disclosure.

FIG. 5 is a block diagram of a communication system 500, such as a SerDes communication system, including a transmitter 510 transmitting signals through a transmission line 530 to a receiver 550, the receiver 550 having an equalizer circuit 551 according to various embodiments of the present disclosure. In some embodiments, the transmitter 510 may include a serializer portion of a SerDes communication system, where multiple streams of data (e.g., bitstreams) are received in parallel (e.g., received over a bus that is K bits wide) and serialized into a single stream of data (e.g., a single bitstream that is 1 bit wide). The transmitter 510 encodes the data using a modulation scheme such as a pulse amplitude modulation with N voltage signaling levels (PAM-N) and supplies the encoded signal to a transmission line 530. Examples of transmission lines 530 include external wiring, internal connections, and the like.

For example, the transmitter 510 may be a first network adapter and the receiver 550 may be a second network adapter, where the transmission line 530 may be a network cable. As another example, the transmitter 510 may be an expansion card (e.g., a graphics card) and the receiver 550 may be a memory or central processing unit, where the transmission line 530 may be traces on a mainboard (or motherboard) of a computer system, where the traces form a portion of a PCIe bus. As another example, the transmitter 510 may be a USB interface of a peripheral device and the receiver 550 may be a host computer system, where the transmission line 530 may be a USB cable.

As noted above, the transmission line 530 can introduce distortions in the encoded signal due to, for example, frequency-dependent attenuation and inter-symbol interference (e.g., caused by reflections). The nature of the distortions introduced by the transmission line 530 can vary depending on the electrical characteristics of the transmission line 530 and environmental conditions (e.g., impedance, discontinuities, external interference, and the like).

The receiver 550 is connected to the transmission line 530 and receives the signal, as distorted by the transmission line 530. An equalizer circuit 551 of the receiver 550 is connected to the transmission line 530 and is configured by a controller 553 to reduce or remove the effect of the distortions. The controller 553 may use feedback information based on the quality of the output symbols to adjust the parameters of the equalizer or may store settings to configure the equalizer based on, for example, parameters associated with the transmission line 530 connected to the receiver and/or provided from the transmitter 510 (e.g., through a side channel communication). The parameters supplied from the controller 553 to configure the equalizer may include, but are not limited to, the coefficients of the taps (e.g., tap1, tap2, etc. coefficients to weight the feedforward and feedback taps) and, in the case of floating taps, the positions of the floating taps. Embodiments of the present disclosure as described herein may integrated into the equalizer circuit 551 to provide, for example, a decision feedback equalizer with a feedforward finite impulse response filter, where the feedforward finite impulse response filter provides a feedforward signal in place of a first tap feedback signal from the decision feedback equalizer.

The output of the equalizer circuit 551 is shown in FIG. 5 as a stream of symbols (e.g., different voltage levels), and the stream of symbols may be decoded by a decoder circuit 555 of the receiver 550. The decoder circuit 555 decodes the stream of symbols to generate, for example, a bitstream that may be further processed by the receiver 550 and/or an electronic circuit connected to the receiver 550, such as by being deserialized into a plurality of streams of data (e.g., a data path that is K bits wide).

Figure 6A:
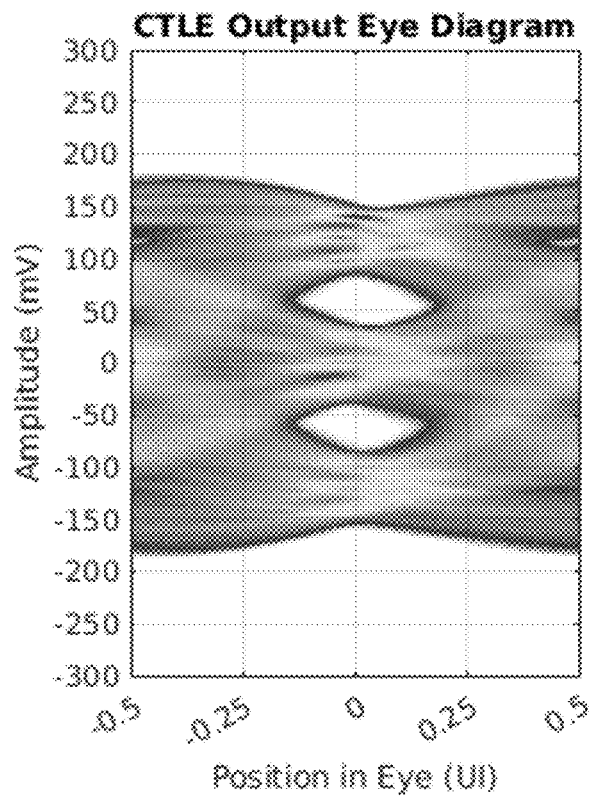
FIG. 6A is an eye diagram at an output of an analog front end (AFE), such as at the output of a continuous time linear equalizer (CTLE) of an equalizer circuit according to one embodiment of the present disclosure.
Figure 6B:
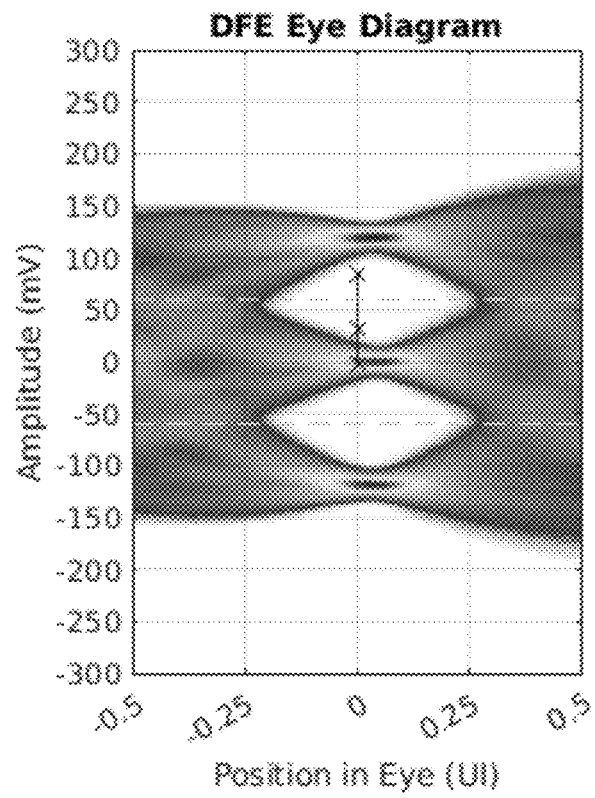
FIG. 6B is an eye diagram at an output of a decision feedback equalizer (DFE) with a feedforward finite impulse response filter according to one embodiment of the present disclosure.

FIG. 6A is an eye diagram at an output of an analog front end (AFE), such as at the output of a continuous time linear equalizer (CTLE) of an equalizer circuit according to one embodiment of the present disclosure. FIG. 6B is an eye diagram at an output of a decision feedback equalizer (DFE) with a feedforward finite impulse response filter according to one embodiment of the present disclosure. Referring, for example, to FIG. 1A, the eye diagram of FIG. 6A corresponds to the output of the AFE 102 and the eye diagram of FIG. 6B corresponds to the output of the data slicer 110, which has been corrected to remove intersymbol interference using the analog FIR filter circuit 190 according to embodiments of the present disclosure.

FIGS. 6A and 6B depict eye diagrams for a Universal Serial Bus 4 version 2 (USB4 v2.0) use case, where the USB4 v2.0 protocol uses a 40 Gbps PAM-3 signaling protocol. The eyes of FIG. 6B have larger openings than FIG. 6A and exceeds the formal requirements of USB4 v2.0 with respect to bit error rate (BER), even given highly distorted input (corresponding to a poor eye diagram) at the input.

Accordingly, aspects of embodiments of the present disclosure enable implementation of PAM-N receivers (for N greater than 2) operating at bitrates above 16 Gbps without loop unrolling and without using a Digital Signal Processor (DSP).

While embodiments of the present disclosure are described above with respect to an analog finite impulse response filter circuit configured to generate a feedforward signal that is supplied to a DFE implemented using a data slicer circuit and a plurality of latches storing taps for the feedback signal, embodiments of the present disclosure are not limited thereto and may be used in conjunction with a DSP.

Figure 7:
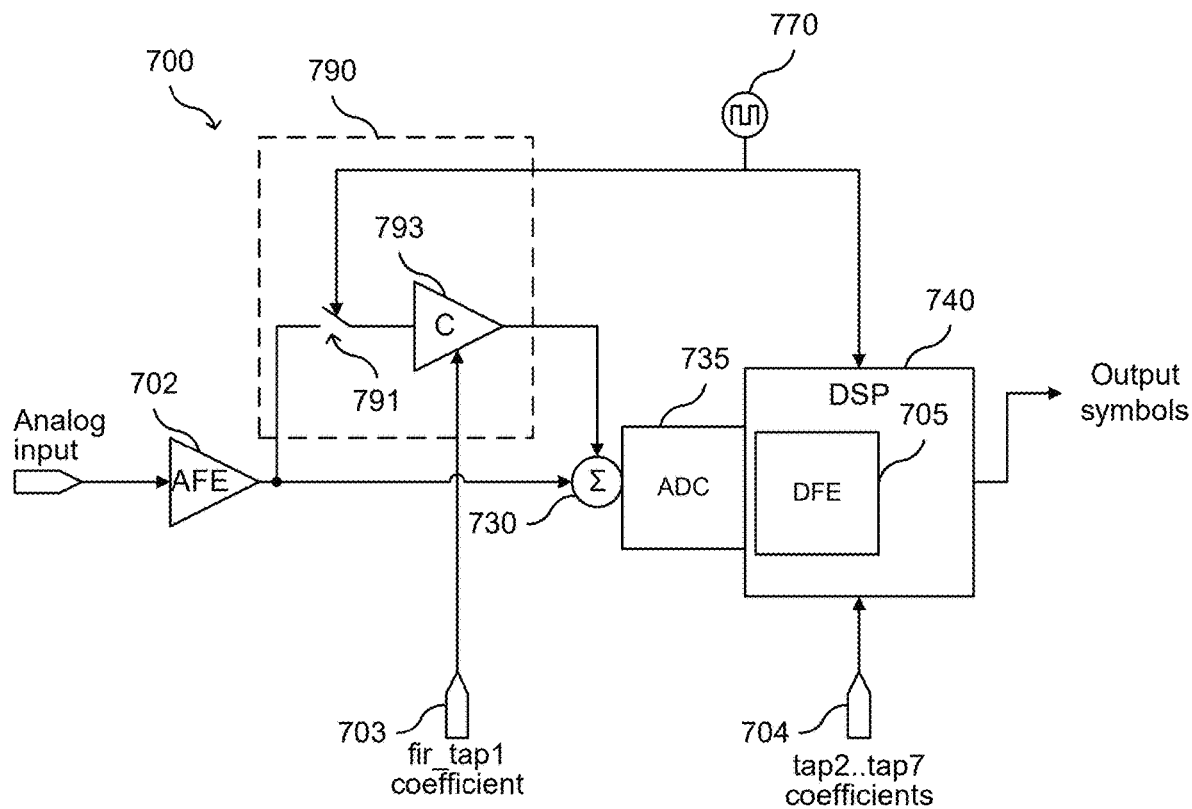
FIG. 7 is a block diagram of an equalizer circuit including a digital signal processor (DSP) according to one embodiment of the present disclosure.

FIG. 7 is a block diagram of an equalizer circuit 700 including a digital signal processor (DSP) according to one embodiment of the present disclosure. In the embodiment shown in FIG. 7, the DFE portion 705 of the equalizer circuit 700 is implemented in a DSP 740, which takes an input from an analog front end 702 and from an analog FIR filter circuit 790. The analog FIR filter circuit 790 includes a sample and hold circuit 791 and a weighting circuit 793 similar to those described above with respect to FIG. 1A. FIG. 7 further shows a summing circuit 730 and an analog-to-digital converter (ADC) 735 at the input of the DSP 740 where the output of the AFE 702 is combined with the output of the analog FIR filter circuit 790 and then converted from an analog signal to a digital signal by the ADC 735 before supplying the digital input to the DSP 740. The analog FIR filter circuit 790 is configured based on a coefficient for the first tap, received from a controller through a first input port 703, and the DFE portion 705 is configured based on coefficients for the second tap and later taps, received from a controller through a second input port 704. A clock signal 770 controls the operation of the DFE 705 implemented in the DSP 740 and also controls the sample and hold circuit 791 of the analog FIR filter circuit 790.

The analog FIR filter circuit 790 in the equalizer circuit 700 shown in FIG. 7 generates a feedforward signal corresponding to the first tap (e.g., the immediately preceding symbol) and therefore relieves the burden on the DSP to compute a feedback signal based on the first tap. For example, if a feedforward signal generated using an analog FIR filter circuit 790 according to embodiments of the present disclosure was not available, the DSP would need to compute the feedback signal for the first tap based on the output of the ADC 735. In order to meet the timing constraints (e.g., to compute the feedback signal for the first tap before the arrival of the next symbol), the DSP would need to include more gates and consume more power (e.g., due to larger circuit area and higher clock rate to compute the feedback signal). Accordingly, embodiments of the present disclosure allow the use of a less powerful DSP 740 for the equalizer circuit 700 (e.g., compared to a DSP that had to also compute a feedback signal for the first tap), thereby reducing power consumption and/or reducing latency introduced by the DSP because a feedforward first tap signal is computed by, for example, the analog FIR filter circuit 790. In addition, by including the feedforward signal corresponding to the first tap generated by the analog FIR filter circuit 790, the signal equalization at the input of the ADC 735 is improved (e.g., reducing the range of the analog signal that is supplied to the ADC 735). This reduces the required input dynamic range of the ADC 735, which allows for a less constrained ADC design and/or to an increase of the resolution of the ADC (e.g., lower ADC least significant bit value) if the number of ADC bits is kept constant and the ADC dynamic range decreases. Furthermore, because the feedforward signal corresponding to the first tap at the ADC input will cancel the intersymbol interference (ISI) present in this pulse response location, the amount of residual ISI to be cancelled by the DSP equalizers at the same pulse response location is reduced. This leads to smaller coefficients on the DSP equalizer dedicated to cancel ISI at this pulse response location (e.g., the first tap pulse response location), where its impact on the other FFE coefficients is marginal. As such, embodiments of the present disclosure removes the need for the DFE 705 to cancel the residual ISI at this first tap pulse response location.

Figure 8:
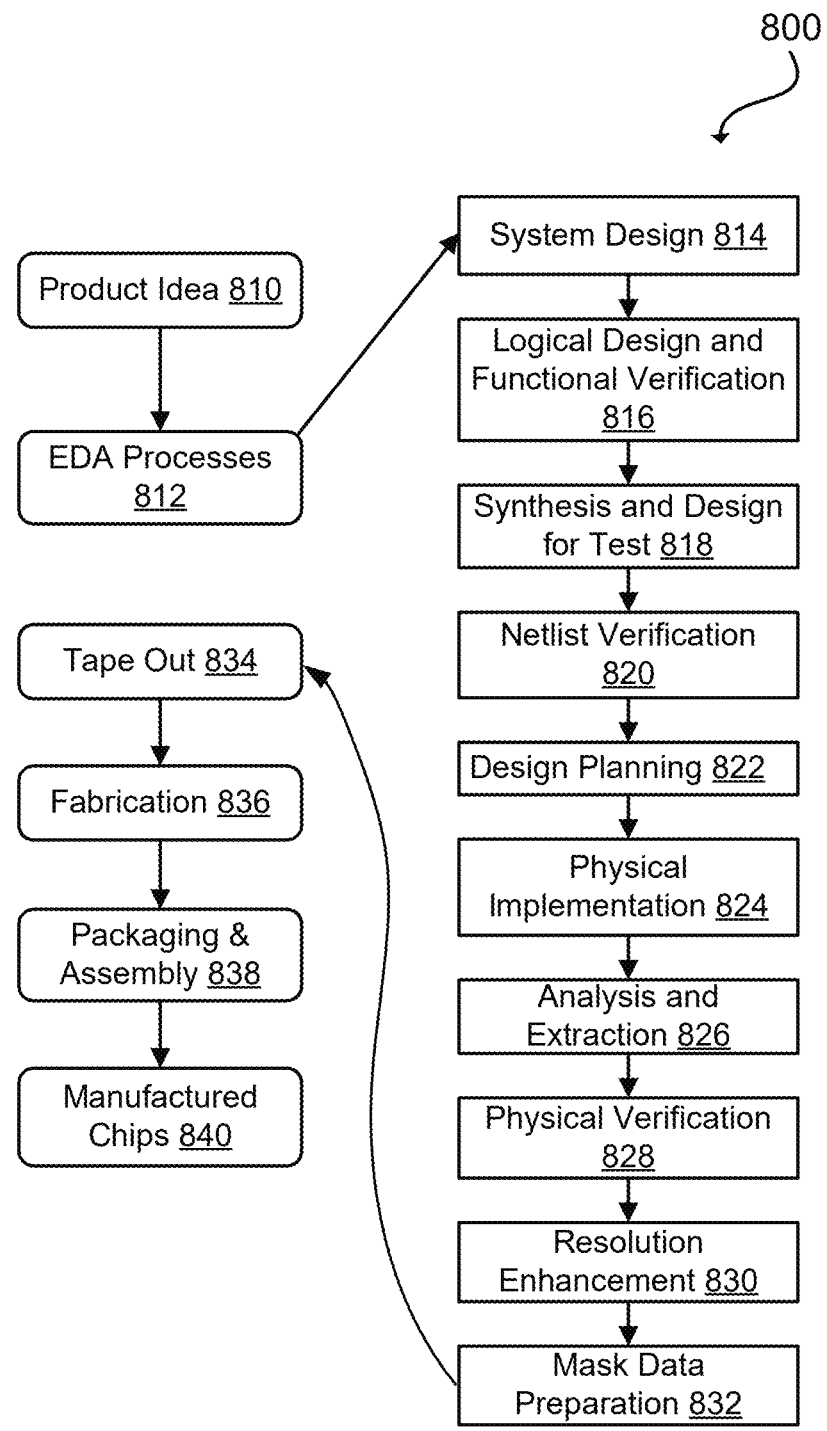
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by FIG. 8 may be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
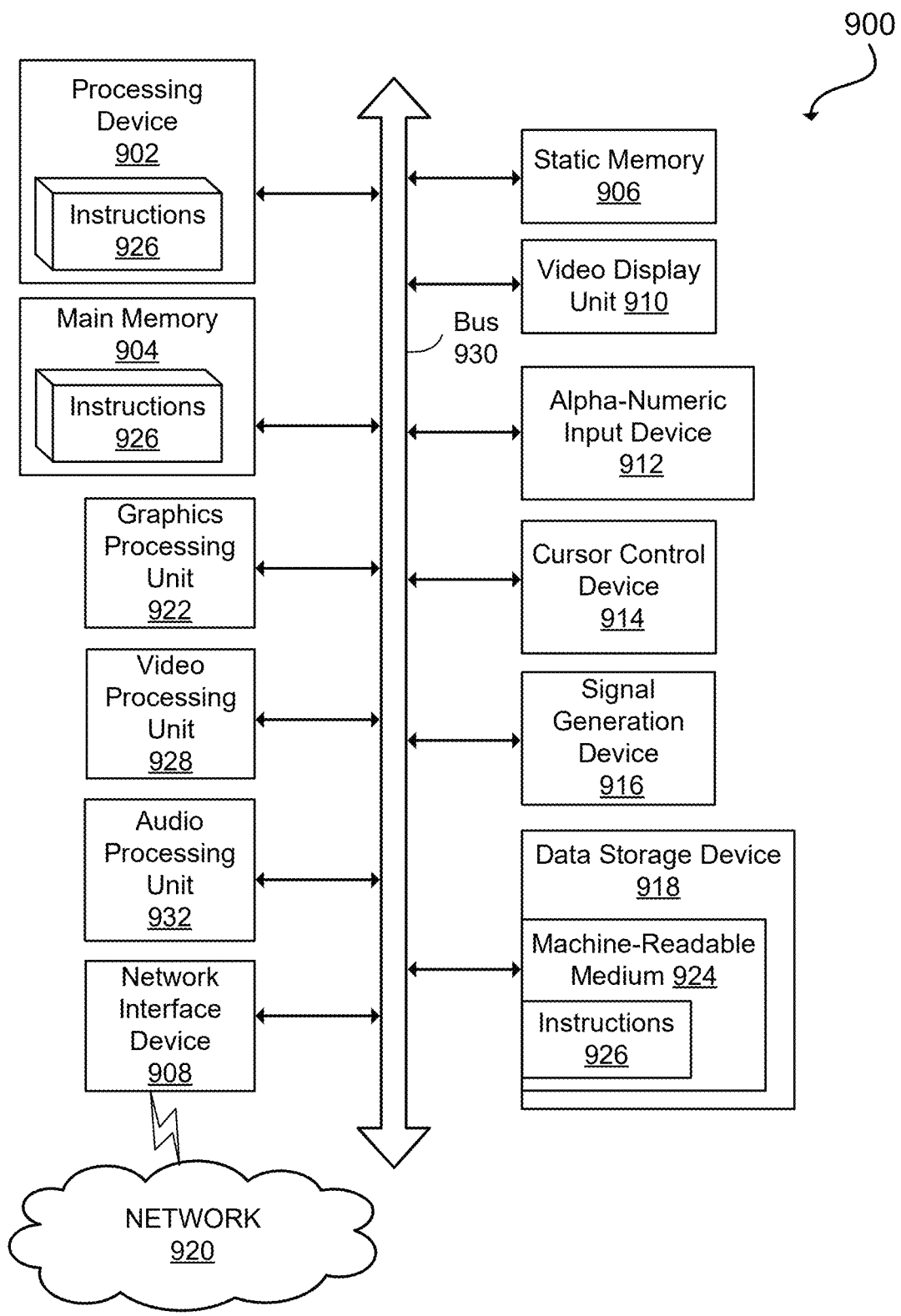
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

A computer-readable design of an equalizer circuit according to the present disclosure may be included within a library of available pre-designed cells or circuit blocks or circuit portions stored on a computer-readable medium (e.g., in a digital representation of an equalizer circuit). This allows the design of an equalizer circuit according to the present disclosure to be placed as a circuit block within a design of an integrated circuit (e.g., a digital representation of the integrated circuit). For example, an equalizer circuit specified by the computer-readable design may be incorporated into the design of an analog or mixed-signal integrated circuit of a receiver, such as a deserializer in a Serdes communications system).

Specifications for a circuit or electronic structure (which may also be referred to as "instructions, which when executed by a processor, cause the processor to generate a digital representation of the circuit or electronic structure") may range from low-level transistor material layouts to high-level description languages.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:
1. An equalizer circuit comprising:
an analog front end circuit configured to receive an analog input signal from a transmission line;
an analog finite impulse response filter circuit comprising:
a sample and hold circuit configured to sample an output of the analog front end circuit; and
a weighting circuit configured to weight the output of the analog front end circuit to generate a feedforward signal;
a decision feedback equalizer circuit configured to receive an output of the analog front end circuit and the feedforward signal; and
a first input port for receiving a coefficient for a first tap, the weighting circuit of the analog finite impulse response filter circuit being configured to weight the output of the analog front end circuit based on the coefficient for the first tap.

2. The equalizer circuit of claim 1, wherein the analog finite impulse response filter circuit comprises a delay circuit configured to delay a clock signal controlling the sample and hold circuit.

3. The equalizer circuit of claim 1,
wherein the equalizer circuit comprises a second input port for receiving a coefficient for a second tap, the decision feedback equalizer circuit being configured to weight an output of a slicer circuit based on the coefficient for the second tap.

4. The equalizer circuit of claim 1, wherein the decision feedback equalizer circuit comprises:
a data slicer; and
a plurality of clocked latches.

5. The equalizer circuit of claim 4, wherein the decision feedback equalizer circuit further comprises a latch connected between the data slicer and the plurality of clocked latches.

6. The equalizer circuit of claim 1, wherein the decision feedback equalizer circuit is implemented in a digital signal processor.

7. The equalizer circuit of claim 1, wherein the analog front end circuit comprises a continuous time linear equalizer circuit.

8. A receiver circuit comprising:
an equalizer circuit comprising:
an analog front end circuit configured to receive an analog input signal from a transmission line;
an analog finite impulse response filter circuit comprising:
a sample and hold circuit configured to sample an output of the analog front end circuit; and
a weighting circuit configured to weight the output of the analog front end circuit to generate a feedforward signal; and
a decision feedback equalizer circuit configured to receive an output of the analog front end circuit and the feedforward signal;
a symbol decoder circuit configured to decode a stream of symbols received from the decision feedback equalizer circuit to generate a corresponding bitstream; and
a controller configured to control the weighting circuit of the analog finite impulse response filter circuit to weight the output of the analog front end circuit based on a coefficient for a first tap.

9. The receiver circuit of claim 8, wherein the controller is further configured to control:
the decision feedback equalizer circuit to weight an output of a slicer circuit based on a coefficient for a second tap.

10. The receiver circuit of claim 8, wherein the analog finite impulse response filter circuit comprises a delay circuit configured to delay a clock signal controlling the sample and hold circuit.

11. The receiver circuit of claim 8, wherein the decision feedback equalizer circuit comprises:
a data slicer; and
a plurality of clocked latches.

12. The receiver circuit of claim 11, wherein the decision feedback equalizer circuit further comprises a latch connected between the data slicer and the plurality of clocked latches.

13. The receiver circuit of claim 8, wherein the decision feedback equalizer circuit is implemented in a digital signal processor.

14. The receiver circuit of claim 8, wherein the analog front end circuit comprises a continuous time linear equalizer circuit.

15. A non-transitory computer-readable medium comprising stored instructions, which when executed by a processor, cause the processor to generate a digital representation of an integrated circuit comprising:
an analog front end circuit configured to receive an analog input signal from a transmission line;
an analog finite impulse response filter circuit comprising:
a sample and hold circuit configured to sample an output of the analog front end circuit; and
a weighting circuit configured to weight the output of the analog front end circuit to generate a feedforward signal;
a decision feedback equalizer circuit configured to receive an output of the analog front end circuit and the feedforward signal; and
a first input port for receiving a coefficient for a first tap, the weighting circuit of the analog finite impulse response filter circuit being configured to weight the output of the analog front end circuit based on the coefficient for the first tap.

16. The non-transitory computer-readable medium of claim 15, wherein the analog finite impulse response filter circuit comprises a delay circuit configured to delay a clock signal controlling the sample and hold circuit.

17. The non-transitory computer-readable medium of claim 15,
wherein the integrated circuit further comprises a second input port for receiving a coefficient for a second tap, the decision feedback equalizer circuit being configured to weight an output of a slicer circuit based on the coefficient for the second tap.

18. The non-transitory computer-readable medium of claim 15, wherein the decision feedback equalizer circuit comprises:
a data slicer; and
a plurality of clocked latches.

19. The non-transitory computer-readable medium of claim 18, wherein the decision feedback equalizer circuit further comprises a latch connected between the data slicer and the plurality of clocked latches.

20. The non-transitory computer-readable medium of claim 15, wherein the decision feedback equalizer circuit is implemented in a digital signal processor.

* * * * *